US009479005B2

(12) United States Patent
Jung et al.

(10) Patent No.: US 9,479,005 B2
(45) Date of Patent: Oct. 25, 2016

(54) WIRELESS POWER RECEIVING APPARATUS AND POWER CONTROL METHOD THEREOF RELATED APPLICATIONS

(75) Inventors: Chun-Kil Jung, Seoul (KR); Yoon-Sang Kuk, Gwacheon-si (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 813 days.

(21) Appl. No.: 13/428,226

(22) Filed: Mar. 23, 2012

(65) Prior Publication Data

US 2012/0242163 A1 Sep. 27, 2012

(30) Foreign Application Priority Data

Mar. 23, 2011 (KR) .................... 10-2011-0026057

(51) Int. Cl.
*H02J 17/00* (2006.01)
*H02J 7/02* (2016.01)

(52) U.S. Cl.
CPC ..................... *H02J 7/025* (2013.01)

(58) Field of Classification Search
CPC .......... H02J 5/005; H02J 7/025; H02J 17/00; H01F 38/14; B60L 11/182
USPC .......................................... 307/104
See application file for complete search history.

(56) References Cited

U.S. PATENT DOCUMENTS

| 2007/0145830 | A1* | 6/2007 | Lee | H02J 5/005 307/135 |
| 2007/0229256 | A1* | 10/2007 | Seal | G01R 22/066 340/551 |
| 2007/0279002 | A1* | 12/2007 | Partovi | 320/115 |
| 2008/0061735 | A1* | 3/2008 | Toya et al. | 320/108 |
| 2009/0140691 | A1* | 6/2009 | Jung | 320/108 |
| 2009/0206791 | A1* | 8/2009 | Jung | 320/108 |
| 2010/0084918 | A1* | 4/2010 | Fells et al. | 307/32 |
| 2010/0156343 | A1* | 6/2010 | Jung | 320/108 |
| 2010/0211347 | A1* | 8/2010 | Friedrich | G01R 33/0023 702/117 |

(Continued)

FOREIGN PATENT DOCUMENTS

| CN | 101335470 A | 12/2008 |
| CN | 101950999 A | 1/2011 |

(Continued)

OTHER PUBLICATIONS

Office Action issued by SIPO on Nov. 20, 2013 for corresponding Chinese Application No. 201210075358.1.

(Continued)

*Primary Examiner* — Jared Fureman
*Assistant Examiner* — Brian K Baxter
(74) *Attorney, Agent, or Firm* — Stein IP, LLC

(57) ABSTRACT

A wireless power receiving device and a power control method thereof. The wireless power receiving apparatus, includes: a secondary core configured to receive a wireless power signal from a primary core of a wireless power transmission apparatus; a magnetic sensor configured to detect a magnetic field generated from the primary core; and a receiving controller configured to transmit an error code to the wireless power transmission apparatus via the secondary core if a measured magnetic field value from the magnetic sensor is lower than a reference magnetic value and the communication with the wireless power transmission apparatus is available.

19 Claims, 3 Drawing Sheets

(56) References Cited

U.S. PATENT DOCUMENTS

| | | | |
|---|---|---|---|
| 2010/0244583 A1* | 9/2010 | Shimokawa | H01Q 7/00 307/104 |
| 2010/0259217 A1* | 10/2010 | Baarman et al. | 320/108 |
| 2011/0018360 A1* | 1/2011 | Baarman et al. | 307/104 |
| 2011/0018498 A1* | 1/2011 | Soar | 320/108 |
| 2011/0074581 A1* | 3/2011 | Falkenberg | G08B 13/2402 340/568.1 |
| 2011/0181238 A1* | 7/2011 | Soar | B60N 2/24 320/108 |
| 2012/0001493 A1* | 1/2012 | Kudo | H02J 5/005 307/104 |
| 2012/0124418 A1* | 5/2012 | Liu et al. | 714/14 |
| 2014/0111147 A1* | 4/2014 | Soar | H01F 27/365 320/108 |
| 2015/0341087 A1* | 11/2015 | Moore | H04B 5/0031 455/77 |

FOREIGN PATENT DOCUMENTS

| | | |
|---|---|---|
| JP | 2004-208383 | 7/2004 |
| JP | 2006-60909 | 3/2006 |
| KR | 10-2009-0089941 | 8/2009 |

OTHER PUBLICATIONS

Chinese Office Action issued by SIPO, issued Jun. 23, 2014, to the corresponding Chinese Application No. 201210075358.1.

Korean Office Action dated May 29, 2012, issued in corresponding Korean Patent Application No. 10-2011-0026057.

* cited by examiner

WIRELESS POWER RECEIVING APPARATUS AND POWER CONTROL METHOD THEREOF RELATED APPLICATIONS

CROSS-REFERENCE TO RELATED APPLICATIONS

This application claims the benefit of Korean Application No. 10-2011-0026057, filed Mar. 23, 2011, issued as Korean Patent No. 10-1246693 on Mar. 21, 2013, in the Korean Intellectual Property Office, the disclosure of which is incorporated herein by reference.

BACKGROUND

1. Field

The following description relates to a wireless power receiving apparatus and a power control method thereof.

2. Description of the Related Art

Generally, a battery pack receives electric power from an external charging device and supplies the power for operating a portable terminal including a mobile phone and a Personal Digital Assistant (PDA) in a charged state. The battery pack includes a battery cell for charging the electric energy and a circuit for charging and discharging the battery cell, i.e., supplying the electric energy to a portable terminal.

An electrical connection method of the battery pack and the charging device for charging the electric energy to the battery pack used in the portable terminal includes a terminal supplying method for receiving the commercial electricity, converting the commercial electricity into voltage and current corresponding to the battery pack, and supplying the electric energy to the battery pack via the terminal of the corresponding battery pack.

However, when the power is supplied by the terminal supplying method, there is a problem that an instantaneous discharge phenomenon occurs since both terminals of the battery pack and the charging device have different potential differences when the charging device and the battery pack contact with or are separated from each other.

Particularly, when foreign objects are stacked up on both terminals due to the instantaneous discharge phenomenon, a fire may break out.

There are also problems that the electric energy charged in the battery pack is naturally discharged to the outside via the terminal of the battery pack due to moisture, which causes a reduction in the lifespan and a deterioration in performance of the battery pack.

Recently, controlling methods and charging systems of a non-contact type using a wireless power transmission method have been suggested to solve the above-mentioned and/or other problems.

There have been studies for increasing the wireless power transmission efficiency as well as stable power reception in the wireless power transmission system.

SUMMARY

An embodiment of the present application provides a power reception control method for increasing wireless power transmission efficiency by detecting a foreign object in a wireless power transmission system and correspondingly controlling power transmission, and a wireless power receiving apparatus employing the same.

To achieve the above and/or other embodiments of the present application, provided is a wireless power receiving apparatus, including: a secondary core configured to receive a wireless power signal from a primary core of a wireless power transmission apparatus; a magnetic sensor to detect a magnetic field generated from the primary core; and a receiving controller to transmit an error code to the wireless power transmission apparatus via the secondary core if a measured magnetic field value from the magnetic sensor is lower than a reference magnetic value and the communication with the wireless power transmission apparatus is available.

The magnetic sensor may be a hall IC sensor.

The magnetic sensor may be installed on a main surface of the wireless power receiving apparatus.

The apparatus may further includes an alarm module, wherein the receiving controller outputs error data showing that the wireless power signal cannot be received through the alarm module if the measured magnetic field value from the magnetic sensor is lower than the reference magnetic value The apparatus may further include: a battery, wherein the receiving controller transmits a wireless power change signal to the wireless power transmission apparatus based on a charging state signal measured in the battery.

To achieve the above and/or other embodiments of the present application, provided is a method for controlling a receiving power in a wireless power receiving apparatus, the method including: obtaining a measured magnetic field value by measuring a magnetic field formed by a primary core of a wireless power transmission apparatus via a magnetic sensor installed on the wireless power receiving apparatus; and transmitting an error code to the wireless power transmission apparatus via the secondary core if a measured magnetic field value from the magnetic sensor is lower than a reference magnetic value and the communication with the wireless power transmission apparatus is available.

The magnetic sensor may be a hall IC sensor.

The magnetic sensor may be installed on a main surface of the wireless power receiving apparatus.

The method may further include: outputting error data showing that the wireless power signal is not received through the alarm module if the measured magnetic field value from the magnetic sensor is lower than the reference magnetic value.

The method may further include: transmitting a wireless power change signal to the wireless power transmission apparatus based on a charging state signal measured in a battery of the wireless power receiving apparatus.

According to an exemplary embodiment of the present document, the foreign object existing between the wireless power transmission apparatus and the wireless power receiving apparatus during the wireless charging or before starting the wireless charging may be detected. Accordingly, wireless power transmission efficiency may be improved by controlling a wireless power transmission.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
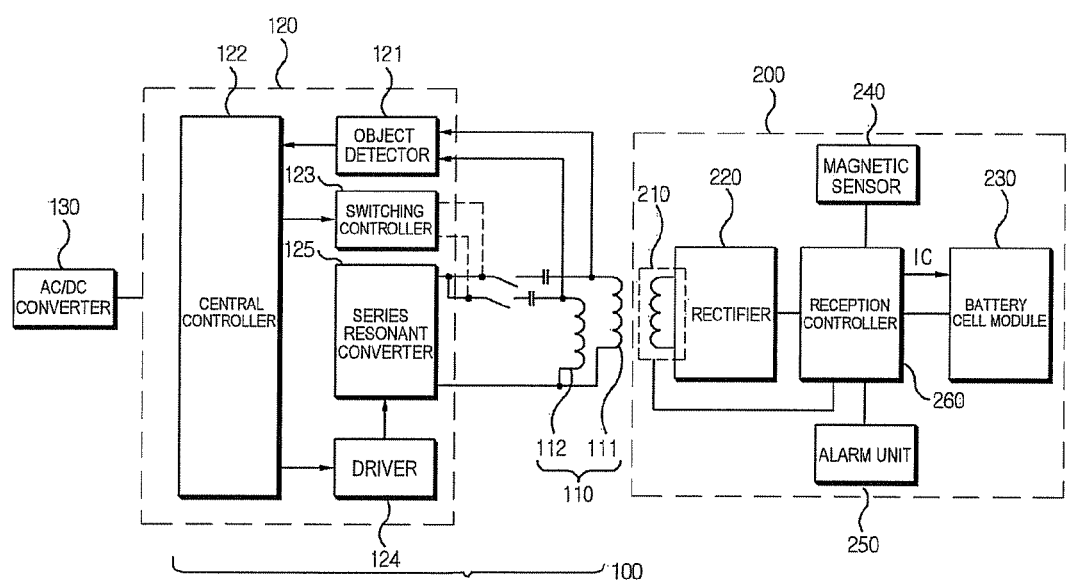
FIG. 1 is a block diagram showing a wireless power transmission system according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a method for selectively controlling a power transmission coil in a wireless power transmission apparatus will be described in detail with reference to the accompanying drawings. The suffixes "module", "-er" and "-or" used in the detailed description are given to the constituent elements to take advantage of the ease in writing the description. The suffixes may be alternatively used and do not have a distinct difference or role in themselves.

FIG. 1 is a block diagram showing a wireless power transmission system according to an exemplary embodiment.

As shown in FIG. 1, the wireless power transmission system according to an exemplary embodiment includes a wireless power transmission apparatus 100 and a wireless power receiving apparatus 200. That is, based on electromagnetic induction, when the wireless power transmission apparatus 100 transmits a wireless power signal to the wireless power receiving apparatus 200, the wireless power receiving apparatus 200 receiving the power signal charges a battery with power of the wireless power signal or supplies the power to electronic equipments connected to the wireless power receiving apparatus 200.

Hereinafter, the configuration of each of the wireless power transmission apparatus 100 and the wireless power receiving apparatus 200 will be described.

The wireless power transmission apparatus 100 according to an exemplary embodiment includes a primary core 110, a transmission controller 120 and an alternating current/direct current (AC/DC) converter 130. The primary core 110, i.e., a primary coil, is a device to transmit a power signal to a secondary core 210 of the wireless power receiving apparatus 200 based on electromagnetic induction. According to this exemplary embodiment, two coils including a first sub coil 111 and a second sub coil 112 may be adopted.

With reference to FIG. 1 again, the transmission controller 120 to control the primary core 110 may include an object detector 121, a central controller 122, a switching controller 123, a driver 124 and a series resonant converter 125.

The object detector 121 detects a load change of the primary core 110 as the primary coil, determines whether the load is changed by the wireless power receiving apparatus 200, i.e., functions as an identification (ID) checker, and filters and processes a charging state signal transmitted from the wireless power receiving apparatus 200. That is, when an ID signal as a response signal to an ID call signal transmitted via the primary core 110 is received, the object detector 121 filters and processes the ID signal. When a charging state signal including information on a charging voltage or a battery cell during charging is received during the charge, the object detector 121 filters and processes the charging state signal.

The central controller 122 receives and checks a determination result of the object detector 121, analyzes the ID signal received in the primary core 110, and transmits a power signal for transmitting a wireless power signal via the primary core 110 to the driver 124. Also, in response to the charging state signal being received from the primary core as described below, the central controller 122 changes the wireless power signal by controlling the driver 124 based on the charging state signal.

The switching controller 123 controls a switching operation between the first sub coil 111 and the second sub coil 112 and the series resonant converter 125. The present application adopts two sub coils but is not limited thereto. Only one coil or multiple coils greater than two may be adopted. When one coil is applied, the switching controller 123 is not required.

The driver 124 controls the operation of the series resonant converter 125 by controlling the central controller 122.

The series resonant converter 125 generates the transmission power to generate a power signal to be transmitted through the control of the driver 124 and supplies the transmission power to the primary core 110. In other words, when the central controller 122 transmits the power controlling signal for transmitting a power signal with a required power value to the driver 124, the driver 124 controls the operation of the series resonant converter 125 corresponding to the transmitted power controlling signal. Also, the series resonant converter 125 applies the transmission power corresponding to the required power value to the primary core 110 through the control of the driver 124 to transmit a wireless power signal with a required strength.

In addition, the series resonant converter 125 supplies the power for generating a first object detecting signal and a second object detecting signal via each of the first sub coil 111 and the second sub coil 112, respectively, through the control of the driver 124.

The AC/DC converter 130 is a device to convert an AC power of 220V or 110V into a DC power of a predetermined voltage. As described above, an output voltage value is changed by control of the central controller 122.

The wireless power receiving apparatus 200 receives the power via a power signal and includes the secondary core 210, a rectifier 220, a battery cell module 230, a magnetic sensor 240, an alarm unit 250, and a reception controller 260. The secondary core 210 generates an induction power through receipt of the transmitted power signal. The rectifier 220 rectifies the induced power. The battery cell module 230 is charged with the rectified power. The magnetic sensor 240 detects a magnetic field generated by the primary core. The reception controller 260 controls the secondary core 210, the rectifier 220, the battery cell module 230, the magnetic sensor 240 and the alarm unit 250. The wireless power receiving apparatus 200 may be a battery pack including a battery cell module or a mobile communication terminal including the battery pack.

The secondary core 210 receives the transmitted wireless power signal transmitted from the primary core 110 of the wireless power transmission apparatus 100.

The rectifier 220 rectifies wireless power received from the secondary core into a DC voltage and maintains a charging state with a charging voltage before starting charging.

The battery cell module 230 becomes an object to be charged with the DC power from the rectifier 220 through control of the reception controller 240. The object to be charged may include electronic equipment such as a cellular phone, PMP, and MP3 or other electronic device, as well as the battery cell module 230. The battery cell module 230 includes protection circuits such as a temperature detecting circuit, and over voltage and over current prevention circuits. The battery cell module 230 also includes a charging management module to collect and process information on a charging state of the battery cell.

The magnetic sensor 240 measures a magnetic field generated in the primary core 110 of the wireless power transmission apparatus 100. A Hall IC sensor is used as the magnetic sensor 240, and may be installed on a main surface of the wireless power receiving apparatus 200. It will be described in detail with reference to FIG. 2.

The alarm unit 250 outputs error data showing "no reception of the wireless power" when the wireless power receiving apparatus 200 is not able to receive the wireless power signal or at least not able to fully receive the wireless power signal. Examples of the alarm unit 250 include a speaker and a vibration module or a combination of the two.

The reception controller 260 controls the current of power charged in the rectifier 220 such that the proper current flows in the battery cell module 230. Detailed operations of the reception controller 260 will be described with reference to FIG. 3.

Figure 2:
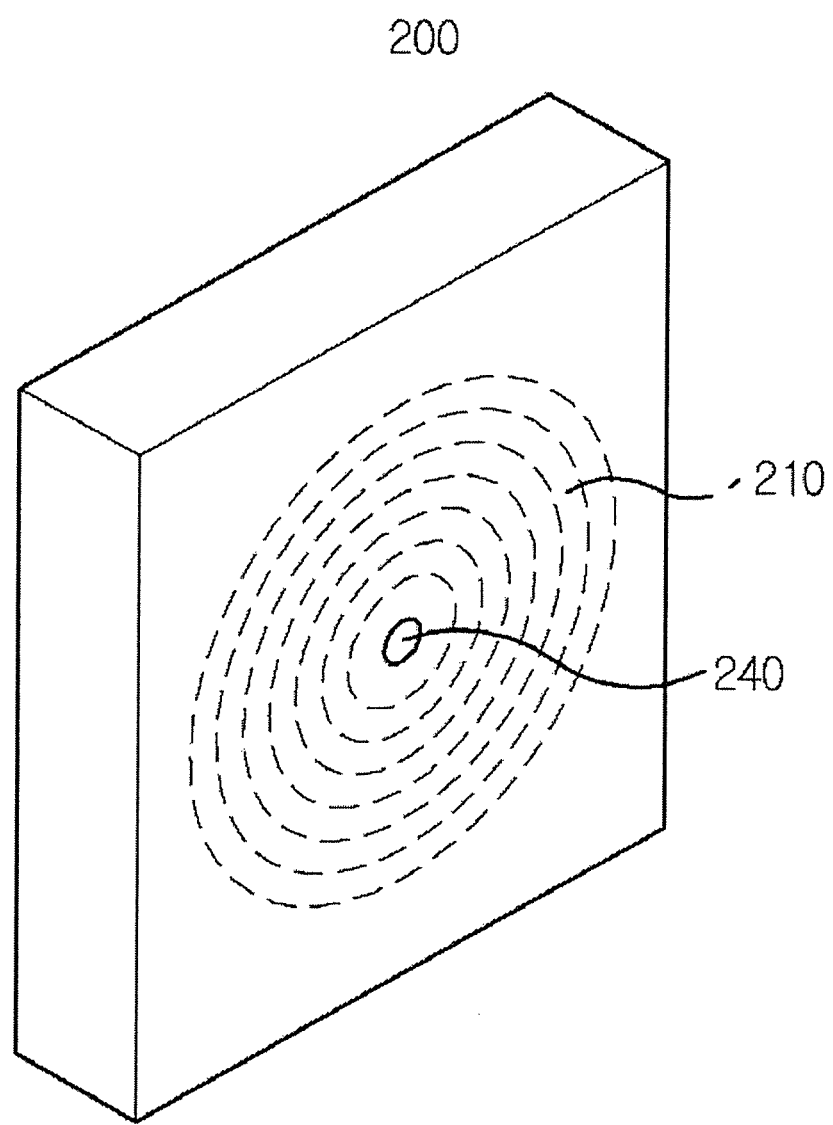
FIG. 2 is a conceptual view describing a position of a magnetic sensor attached to a wireless power receiving apparatus according to an exemplary embodiment.

FIG. 2 is a conceptual view describing a position of the magnetic sensor 240 attached to the wireless power receiving apparatus 200 according to an exemplary embodiment. As shown in FIG. 2, the secondary core 210 is installed on a main surface of the wireless power receiving apparatus 200. The secondary core 210 may be a circular coil or an oval coil. The magnetic sensor 240 corresponds to a central point of the secondary core 210. Accordingly, the magnetic sensor 240 may measure the magnetic field from the primary core more precisely, and be used for detecting a foreign object or checking a home position for charging.

The magnetic sensor 240 may be installed on a protective circuit module (PCM: not shown) of the wireless power receiving apparatus 200. That is, differently from FIG. 2, it should be understood that the magnetic sensor 240 may be installed on a circuit board of the wireless power receiving apparatus 200.

Hereinafter, a power control method in the wireless power receiving apparatus 200 described in FIG. 1 and FIG. 2 will be described in detail with reference to FIG. 3.

Figure 3:
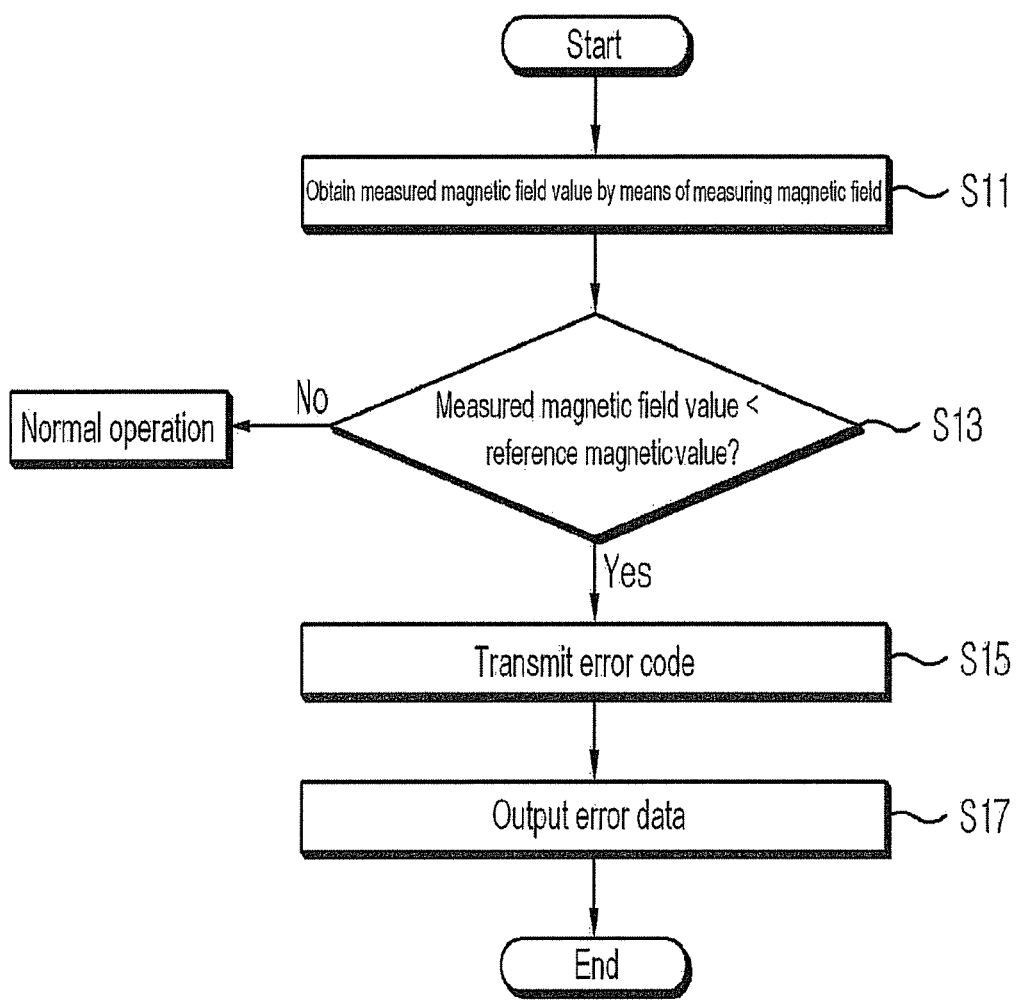
FIG. 3 is a flowchart describing a wireless power control method in the wireless power transmission apparatus according to an exemplary embodiment.

FIG. 3 is a flowchart describing the wireless power control method in the wireless power transmission apparatus according to an exemplary embodiment. As shown in FIG. 3, a measured magnetic field value is obtained at operation S11 by measuring a magnetic field generated by the output (for example, the wireless power signal) of the primary core 110 of the wireless power transmission apparatus 100 via the magnetic sensor 240 installed on the wireless power receiving apparatus 200. The reception controller 260 determines at operation S13 whether the measured magnetic field value from the magnetic sensor 240 is lower than a reference magnetic value. If there is no foreign object, the magnetic field value measured by the magnetic sensor 240 may be the same as or greater than the reference magnetic value. When there is a foreign object such as a coin or a clip near the charging position of the wireless power transmission apparatus 100, the foreign object affects the measured magnetic field value and the magnetic field value becomes lower than the reference magnetic value. The present application pays attention to this phenomenon. Accordingly, a method for detecting a foreign object before starting the wireless charging or during the wireless charging has been developed.

If the measured magnetic field value is the same as or over the reference magnetic value, the reception controller 260 determines that the foreign object is not detected and the wireless charging operation is normally performed. That is, based on a charging state signal measured in the battery cell module 230 of the wireless power receiving apparatus 200, the wireless power change signal is transmitted to the wireless power transmission apparatus 100. If the measured magnetic field value obtained from the magnetic sensor 240 is lower than the reference magnetic value and it is possible to communicate with the wireless power transmission apparatus 100, an error code is transmitted to the wireless power transmission device 100 via the secondary core at operation S15. During the charging process, the wireless power transmission apparatus and the wireless power receiving apparatus 200 are in communication with each other. If the normal communication is impossible, the transmission controller 120 of the wireless power transmission apparatus 100 stops transmission of the wireless power signal. If the measured magnetic field value obtained from the magnetic sensor 240 is lower than or equal to the reference magnetic value, it is determined that the foreign object is detected. Accordingly, an error code is generated and error data showing that the wireless power cannot be received via the alarm unit 250 of the wireless power receiving apparatus 200 may be output at operation S17. The error data are output via a speaker and/or a vibration module. The error code is transmitted through the secondary core 200 to the primary core 110.

According to an exemplary embodiment of the present application having the configuration described above, the foreign object existing between the wireless power transmission apparatus and the wireless power receiving apparatus during the wireless charging or before starting the wireless charging may be detected. Accordingly, a wireless power transmission efficiency may be improved by controlling a wireless power transmission.

It will be apparent to those skilled in the art that the wireless power receiving apparatus and the power control method thereof may not be limitedly applied by the constitution and the method of the above-mentioned exemplary embodiments. All or the part of the exemplary embodiments may be selectively combined and configured to realize diverse modifications.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless power receiving apparatus, comprising:
    a secondary core to receive a wireless power signal from a primary core of a wireless power transmission apparatus;
    a magnetic sensor to detect a magnetic field value generated from the primary core for detecting a foreign object; and
    a receiving controller to determine the foreign object is detected if the detected magnetic field value from the magnetic sensor is lower than a reference magnetic field value, to determine the foreign object is not detected if the detected magnetic field value is equal to or greater than the reference magnetic field value, and to transmit an error code to the wireless power transmission apparatus via the secondary core if the detected magnetic field value from the magnetic sensor is lower than the reference magnetic field value and communication with the wireless power transmission apparatus is available, wherein the error code represents the foreign object is detected, and wherein the wireless power signal is not received when the error code is not transmitted to the wireless power transmission apparatus because of the communication with the wireless power transmission apparatus is not available.

2. The apparatus of claim 1, wherein the magnetic sensor is a Hall IC sensor.

3. The apparatus of claim 1, wherein the magnetic sensor is installed on a main surface of the wireless power receiving apparatus.

4. The apparatus of claim 1, further comprising an alarm module, wherein the receiving controller outputs error data showing that the wireless power signal cannot be fully received through the alarm module if the measured magnetic field value from the magnetic sensor is lower than the reference magnetic field value.

5. The apparatus of claim 1, further comprising a battery, wherein the receiving controller transmits a wireless power change signal to the wireless power transmission apparatus based on a charging state signal measured in the battery.

6. The apparatus of claim 1, wherein the magnetic sensor is positioned at a location corresponding to a central point of the secondary core.

7. The apparatus of claim 1, further comprising a circuit board, wherein the magnetic sensor is installed on the circuit board.

8. The apparatus of claim 7, wherein the circuit board comprises a protective circuit module (PCM).

9. The apparatus of claim 1, wherein the magnetic field value being lower than the reference magnetic field value is indicative of the foreign object on or near a charging position of the wireless power transmission apparatus.

10. A method for controlling a receiving power in a wireless power receiving apparatus, the method comprising:
   obtaining a measured magnetic field value by measuring a magnetic field formed by a primary core of a wireless power transmission apparatus via a magnetic sensor installed on the wireless power receiving apparatus for detecting a foreign object
   determining the foreign object is detected if the measured magnetic field value from the magnetic sensor is lower than a reference magnetic field value and the foreign object is not detected if the measured magnetic field value is equal to or greater than the reference magnetic field value; and
   transmitting an error code to the wireless power transmission apparatus via a secondary core if the measured magnetic field value from the magnetic sensor is lower than the reference magnetic field value and communication with the wireless power transmission apparatus is available,
   wherein the error code represents the foreign object is detected, and
   wherein the wireless power signal is not received when the error code is not transmitted to the wireless power transmission apparatus because of the communication with the wireless power transmission apparatus is not available.

11. The method of claim 10, wherein the magnetic sensor is a Hall IC sensor.

12. The method of claim 10, wherein the magnetic sensor is installed on a main surface of the wireless power receiving apparatus.

13. The method of claim 10, further comprising outputting error data showing that the wireless power signal is not received through the alarm module if the measured magnetic field value from the magnetic sensor is lower than the reference magnetic field value.

14. The method of claim 10, further comprising transmitting a wireless power change signal to the wireless power transmission apparatus based on a charging state signal measured in a battery of the wireless power receiving apparatus.

15. The method of claim 10, wherein the magnetic field value being lower than the reference magnetic field value is indicative of the foreign object on or near a charging position of the wireless power transmission apparatus.

16. The method of claim 10, further comprising stopping a wireless power signal from being transmitted from the wireless power transmission apparatus to the wireless power receiving apparatus in response to the wireless power transmission apparatus receiving the error code.

17. A wireless power transmission system, comprising:
   a wireless power transmission apparatus comprising:
   a primary core to transmit a wireless power signal during wireless charging; and
   a transmission controller,
   a wireless power receiving apparatus comprising:
   a secondary core to receive the wireless power signal from the primary core;
   a magnetic sensor to detect a magnetic field generated from the primary core for detecting a foreign object; and
   a receiving controller to determine the foreign object is detected if the detected magnetic field value is lower than a reference magnetic field value, to determine the foreign object is not detected if the detected magnetic field value is equal to or greater than the reference magnetic field value, and to transmit an error code to the wireless power transmission apparatus if the detected magnetic field value is lower than the reference magnetic field value,
   wherein the transmission controller stops the transmission of the wireless power signal if the error code has been received,
   wherein the error code represents the foreign object is detected, and
   wherein the transmission controller stops the transmission of the wireless power signal when the error code is not received from the wireless power receiving apparatus because of the communication with the wireless power receiving apparatus is not available.

18. The wireless power transmission system of claim 17, wherein the receiving controller transmits the error code through the secondary core to the primary core, and the transmission controller receives the error code from the primary core.

19. The apparatus of claim 1, wherein the magnetic sensor is used for checking charging position.

* * * * *